Figure 1:
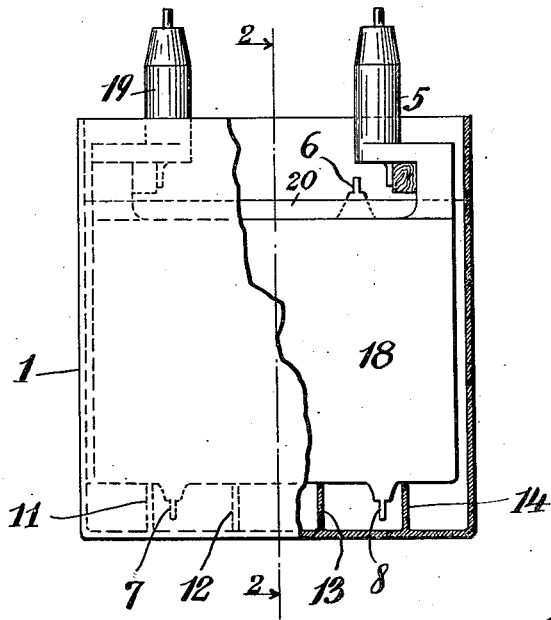

E. HANDLER.
STORAGE BATTERY ELEMENT.
APPLICATION FILED MAY 5, 1916.

1,327,234. Patented Jan. 6, 1920.

Eugene Handler, Inventor
By his Attorney
Thomas Howe

UNITED STATES PATENT OFFICE.

EUGENE HANDLER, OF NEWARK, NEW JERSEY, ASSIGNOR TO GENERAL LEAD BATTERIES COMPANY, A CORPORATION OF DELAWARE.

STORAGE-BATTERY ELEMENT.

1,327,234.  Specification of Letters Patent.  Patented Jan. 6, 1920.

Application filed May 5, 1916. Serial No. 95,535.

*To all whom it may concern:*

Be it known that I, EUGENE HANDLER, a citizen of the United States, and resident of Newark, in the county of Essex and State of New Jersey, have invented certain new and useful Improvements in Storage-Battery Elements, of which the following is a specification.

This invention relates to storage battery elements.

More particularly it relates to an element comprising a plurality of plates and means for separating and spacing them which shall securely hold them in properly spaced relation.

As is well known, it is usual in storage batteries to form each element of a number of plates which are joined together at the top, usually near one corner, by a terminal structure for making the exterior connection. The plates of one element are then inserted between the plates of the other element and are usually separated therefrom by an insulating apertured or porous diaphragm or plate inserted between adjacent plates of the electrodes.

The plates forming a battery element especially the positive element, are liable to buckle or otherwise become displaced and often would come in contact with the plates of opposite sign, thereby causing a short circuit, unless means were provided to prevent it. The curling or bending of the plate in buckling has the effect of throwing the corners out of position and it is therefore important to secure the corners of the plates in proper relative position. The terminal structure already referred to is often located near one corner of the plates and may serve as a separator and spacer for that corner. This, however, does not prevent the distortion and displacement of the plates. To secure them in proper relative position I distribute securing and spacing means about the remainder of the periphery of the plates. Inasmuch as the corners are liable to the greatest distortion, the best results can be achieved by having a spacing device corresponding to each corner and located adjacent thereto.

I preferably form the separating and spacing devices of a strip with the greatest dimension of cross section vertical so that it opposes a large resistance to any bending moment which may be exerted upon the strip by a force tending to displace the plates, and a minimum surface is formed on which sediment may deposit when the spacers are at the bottoms of the plates.

It is of advantage to secure the spacers at the tops and bottoms only of the plates so that lateral space will be economized, those at the bottom extending into the space below the top of the mud space at the bottom of the receptacle. The vertical dimensions of the cell will not then be increased over what is necessary to provide the mud space and the terminal structure at the top.

In order that the separators may clear intervening plates, they may be mounted on lugs extending from the plates to which they are attached and the spacers themselves may be advantageously formed of metal strips burned to the lugs or plates, this forming a secure and rigid connection, and also the metal strips make connectors between the plates which promotes an even distribution of the current.

The invention is illustrated in the accompanying drawings of which—

Figure 2:
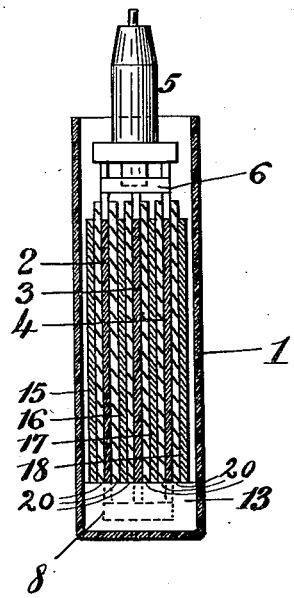
Figure 3:
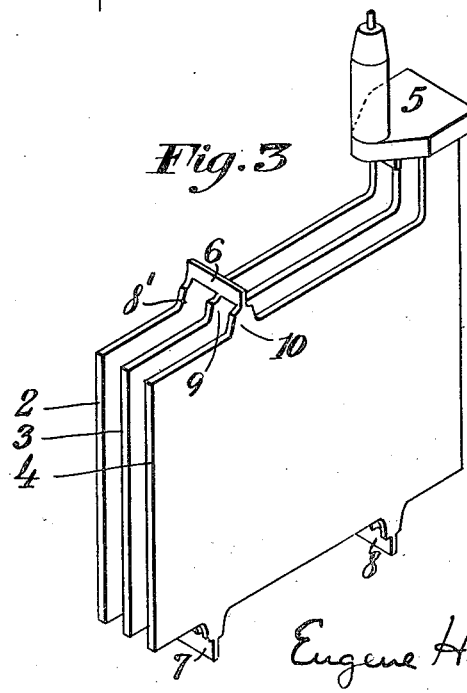

Figure 1 is a side elevation, with the receptacle partly broken away, of a storage battery cell including the invention, Fig. 2 is a section on the line 2—2 of Fig. 1 looking in the direction of the arrow, and Fig. 3 is a perspective view of a storage battery element embodying the invention.

Referring to the drawings, the cell comprises a casing or receptacle 1 of hard rubber or other suitable material in which the electrolyte and the positive and negative elements are placed. The positive element comprises plates 2, 3 and 4 having a terminal structure 5 at one corner and having spacing and separating strips, 6, 7 and 8, one corresponding to each of the plate corners. These strips are of metal which are secured to the plates by burning to lugs extending from the plates. For instance, the strip 6 is burned to the lugs 8, 9 and 10. The terminal and one of the spacers are located at the top of the plates while the spacers 7 and 8 are located at the bottom of the plates, there being no spacers at the sides of the plates, whereby lateral space is economized.

The casing 1 is provided in its bottom with the bars 11, 12, 13 and 14, constituting mud ribs and upon which the battery plates rest, the spacers 7 and 8 extending down between the mud ribs as shown.

The strips 6, 7 and 8, it will be observed, each has its greater dimension of cross section vertical so that for a strip of its dimensions it opposes a maximum resistance to the displacement of the plates and at the same time presents such a narrow surface upon which any material settling to the bottom could lodge that the risk of short circuits caused by active material falling from the plates or other sediment collecting upon the spacer, is negligible.

The positive plates 2, 3 and 4 are sandwiched with the negative plates 15, 16, 17 and 18, connected with the terminal 19, and insulating porous or apertured plates 20 of the usual wood or other material may be inserted between adjacent electrode plates.

While I have illustrated the invention in what is believed to be its best application, it may have other embodiments without departing from its spirit and is not therefore limited to the structures shown in the drawings.

What I claim as new and desire to secure by Letters Patent is:—

1. A storage battery element comprising a plurality of plates and separating and spacing means therefor secured to said plates, there being one of said spacing means corresponding to each plate corner.

2. A storage battery element comprising a plurality of plates, a terminal structure secured to the said plates near one plate corner and a separating and spacing means corresponding to each of the other plate corners, each corner having one of said means nearer to it than to any other corner.

3. In a storage battery element the combination with a plurality of storage battery plates of a separator and spacer secured to said plates and located within the vertical lines through the lateral edges thereof, said separator and spacer being of greater width of cross section than thickness and having the said greater dimension extending substantially vertically.

4. The combination with a receptacle for storage battery elements and electrolyte, having mud ribs therein adapted to engage the bottoms of the elements and support the same, of a battery element comprising a plurality of plates and a spacer and separator secured to said plates and extending below the top of the mud rib.

Signed at New York, in the county of New York, and State of New York, this 1st day of May, A. D. 1916.

EUGENE HANDLER.